Nov. 29, 1949  G. F. SALERNO  2,489,726
PACKAGED FOOD PRODUCT AND PACKING METHOD
Filed Oct. 19, 1948  3 Sheets-Sheet 3

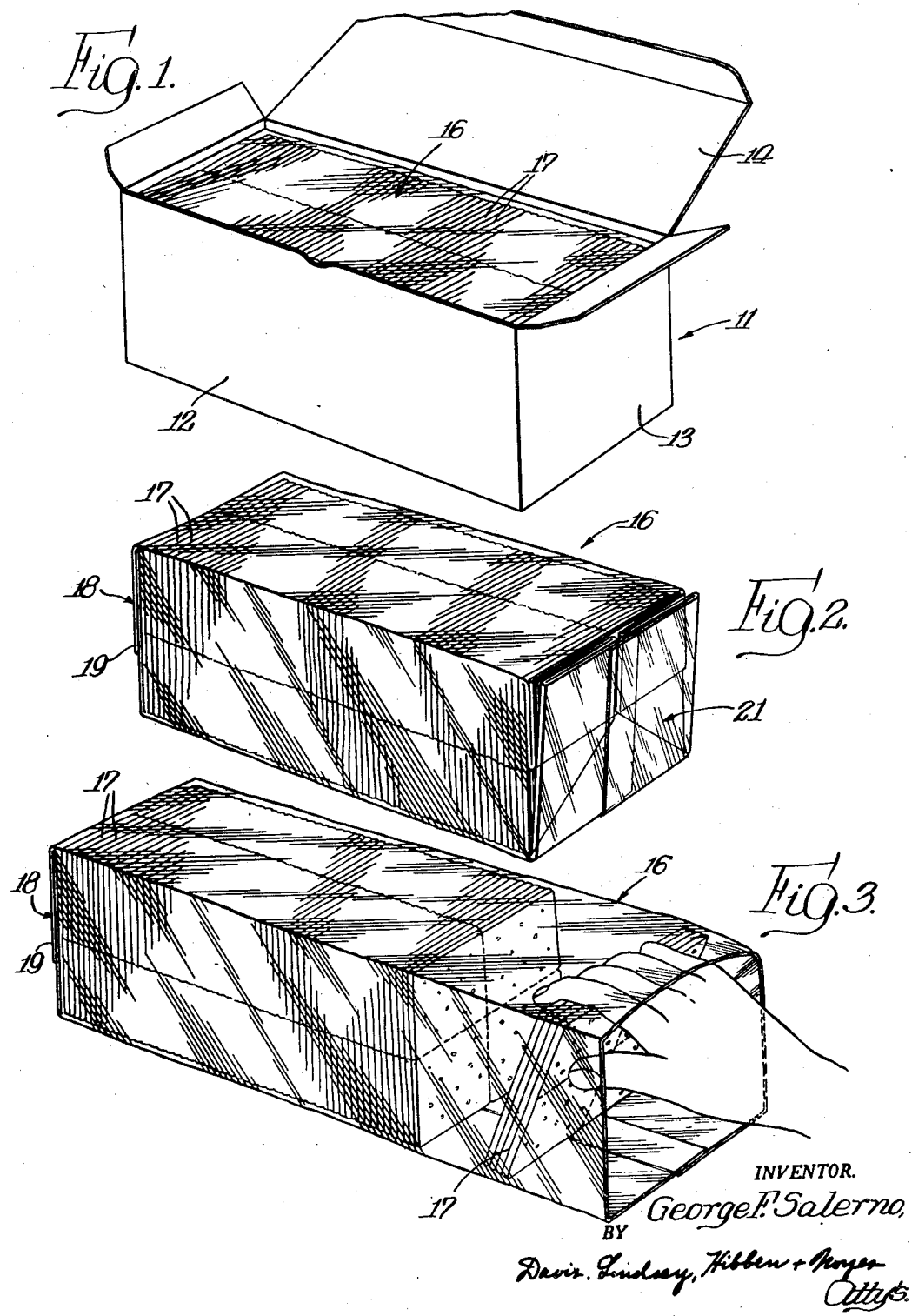

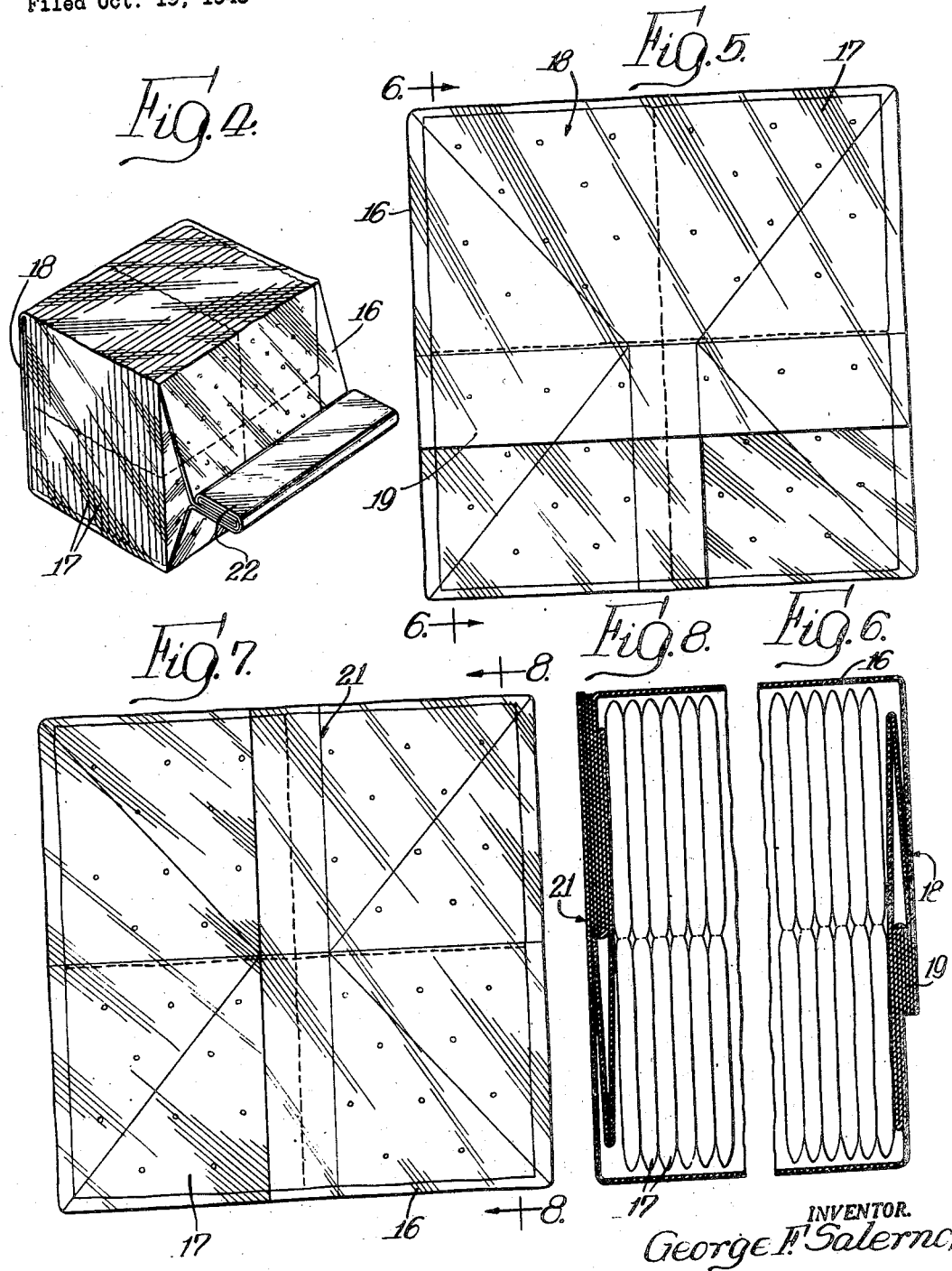

INVENTOR.
George F. Salerno,
BY
Davis, Lindsey, Hibben & Noyes
Attys.

Patented Nov. 29, 1949

2,489,726

UNITED STATES PATENT OFFICE 2,489,726

PACKAGED FOOD PRODUCT AND PACKING METHOD

George F. Salerno, Wilmette, Ill.

Application October 19, 1948, Serial No. 55,354

4 Claims. (Cl. 99—171)

This invention relates to packaged food products and to a manner of packaging the same, and more particularly to packaged baked goods such as soda crackers and Graham crackers, which are intended for consumption in fresh, crisp condition.

For many years manufacturers and consumers of crackers have been confronted with the problem of preventing these products from becoming stale and soggy upon exposure to atmospheric moisture. The problem has been most common with respect to the usually crisp cracker known variously as soda crackers or saltine crackers which in order to be classed as crisp must not possess a moisture content more than five percent (5%). In the popular thin variety of saltine crackers the desired moisture content is as low as three percent (3%). Hence, as a result of their inherently low moisture content, such types of crackers are extremely susceptible to the absorption of moisture from the atmosphere wherein the moisture content is always at a very much higher degree.

It is the usual experience of the housewife that when a larger size box, such as the popular one or two pound size, of these crackers is purchased for ordinary home consumption, the crackers will, after being opened, absorb considerable moisture and consequently become soggy, stale, and unpalatable long before they have been used up. In fact it is common knowledge that consumers will condemn relatively fresh but soggy, moisture-laden crackers as stale even though the package in which they are contained has been open but a short while. Thus, the saving ordinarily realized by the purchase of larger size boxes of crackers is nullified through wastage and spoilage of a large percentage thereof. Once the package has been opened there has heretofore been no satisfactory way of preventing moisture-laden atmospheric air from penetrating the package and reaching the crackers during storage on the pantry shelf, with the result that, although the first quantities of crackers consumed may possess their original crispness and freshly baked flavor, the remaining unconsumed crackers rapidly deteriorate into a soggy unappetizing condition due to the adverse effects of moisture in the air. This difficulty is particularly acute in the southern regions and other excessively humid climates where crackers exposed to the atmosphere will often become soggy in a matter of a few hours. The problem also exists even in northern climates in humid summer weather and in kitchens of homes and large establishments such as hotels and restaurants wherein the crackers are exposed to steam and moisture-laden air from cook stoves and steam tables.

Crackers of the aforementioned type, as sold for ordinary family use, are usually packaged in one or two pound cardboard boxes lined with sheets of wax paper or the like primarily for the purpose of preventing contact of the crackers with the inside of the box. The wax paper or similar paper lining is not usually moisture-proof, it is not sealed in bag form nor is it adapted to enclose the remaining crackers after each use. The entire box is ordinarily sealed in a moisture-proof outer wrapper, such as Cellophane, wax paper or ordinary printed label paper thereby protecting the contents while on the grocer's shelf, but once the housewife breaks this outer seal, no suitable means has been provided to protect the crackers during extended storage periods in the home. About the only precaution the consumer could take was to keep the cover of the box closed during non-use whereby to obtain the meager benefits of the cardboard container in excluding atmospheric moisture. Once the unused crackers became stale and soggy, the only remedy of the housewife was to warm the crackers in an oven before using which would only partially restore their original crispness but even this remedy was not wholly satisfactory in that the original flavor could not be restored. Obviously, such measures fell far short of an adequate solution to the problem.

Furthermore, it is well known that semi-rigid cardboard boxes in which the crackers were so packed contained a certain percentage of moisture, which percentage was relatively high when the crackers were packed in humid climates or in humid summer weather. Consequently, this box moisture was absorbed by the crackers to a degree and the outer moisture-proof wrapping on the box afforded no protection whatsoever.

Another recent commercial attempt to provide a solution to the problem of maintaining crackers in their original fresh condition in the home has been the packaging of the contents of a one pound box, for instance, in separate wrappings or sections of one quarter pound each. For instance, in a large box containing forty to forty-four units of crackers comprising four cracker squares to the unit, the units were wrapped in moisture-proof paper in groups of as many as ten or eleven and then deposited in the box, the theory being that the housewife could open one wrapped group at a time and the original freshness of the other groups could be preserved until their use was required. However, despite the claims made commercially for such a method and style of packaging, it was still not the answer. The wrapped groups were still of such large size that all of the crackers in the group, forty to forty-four in number, could not be eaten at one meal by an average size family, and consequently were left unsealed in the box for the absorption of moisture-laden air, with the result that spoilage and wastage of a good percentage still occurred. This spoilage was repeated for each wrapped group.

It was also found that although each group was wrapped in moisture-proof paper, the wrapping itself was not moisture-proof and airtight as every line of air entry was not sealed and after the partial seal was broken there was no way by which the wrapped paper could be resealed or folded to prevent the penetration of air therewithin. One factor preventing the proper sealing of the wrapping was the inability to apply sufficient heat and pressure along the sealing lines because of the very fragile character of the crackers. Another disadvantage of such individual wrappings was that the cost of production of the large boxes of crackers was considerably increased due to the additional operations, and to the fact that production was bottlenecked by the small one-quarter pound wrappings. It was also found that the crackers were so tightly wrapped as to prevent the ready removal of only the desired number of the group for immediate use and consequently, the seal had to be broken to a great degree which necessarily exposed the majority of crackers thereof. Such excessive breaking of the seal destroyed all possibility of ever resealing the package.

Accordingly, the primary object of the present invention is to provide a packaged food product, such as saltine crackers or the like, in which the crackers, including the very last one to be eaten, may be retained in a fresh and crisp condition long after the package is originally opened, thereby eliminating wastage and spoilage of crackers by their becoming stale and soggy and affording the consumer a means by which he may consume with satisfaction all the crackers for which he has paid.

Another object of the invention is to provide a packaged food product, such as saltine crackers or the like, in which the crackers are enclosed in carefully stacked face-to-face alignment and are protected from the adverse effects of atmospheric moisture throughout the entire period until the supply of crackers is exhausted.

A further object of the invention is to provide a moisture-resistant package for food products, such as saltine crackers and the like, which may be opened and closed for removing crackers as often as desired and which when in closed condition protects the remaining crackers from the adverse effects of moisture-containing atmospheric air.

An additional object of the invention is to provide a moisture-resistant package for food products, such as saltine crackers and the like, which may be opened and closed by folding and unfolding as often as desired and in which only the top cracker or crackers to be immediately consumed are exposed to the effects of atmospheric moisture when the package is opened for the removal of crackers.

A further object is to provide a package for food products, such as saltine crackers or the like, having an outer semi-rigid container and an inner preformed moisture-proof bag with an opening at one end thereof and said bag being longer than the quantity of crackers in stacked relationship contained therein, the longer end of the bag being adapted to be folded over and to abut a closed end of the container to prevent the penetration of moisture-laden air within the bag and the container being adapted to be opened on one of its long sides on which the inner bag has no opening.

Another object is to provide a package for food products, such as saltine crackers or the like, having an outer semi-rigid container and an inner preformed moisture-proof bag with an opening at only one end thereof for access to the contents thereof and of a length greater than the quantity of the contents therein, said longer end of the bag being adapted to be folded and unfolded repeatedly until the last of the contents is consumed and said bag with its end in folded condition being adapted to prevent air circulation and to block off moisture-laden air from the contents.

Still another object of the invention is to provide a package for food products, such as saltine crackers and the like, having an outer semi-rigid container and an inner transparent flexible preformed container substantially conforming to the outline of the crackers therein and through which the crackers may be viewed when the outer container is open but which must be removed from said outer container to permit access to the crackers.

A still further object of the invention is to provide a packaged food product, such as saltine crackers and the like, having a moisture-resistant preformed container for the crackers with a foldable closure, which container may be used as a crisper bag for other purposes when the supply of crackers is exhausted.

Another object of the invention is to provide a novel method of packaging food products, such as saltine crackers and the like, in which the crackers are loaded in attractive aligned condition and affording means by which the consumer may protect the crackers over long periods of time against the effects of moisture-containing atmospheric air.

Other objects and advantages of the invention will be apparent from the subsequent description of the drawings, in which:

Fig. 1 is a perspective view of a box of saltine crackers packaged according to my invention and showing an outer box or preformed bag with its cover opened to display an inner container bag having the crackers enclosed therein;

Fig. 2 is a perspective view of the inner container and its contents after removal from the outer box;

Fig. 3 is a perspective view similar to Fig. 2 and showing the manner of removing crackers from the inner container;

Fig. 4 is a perspective view of the inner container after removal of a substantial portion of the crackers and showing one manner in which the open end of the container may be folded to protect the remaining crackers;

Fig. 5 is an end view of the permanently sealed end of the inner container and its contents as seen from the left end in Fig. 2;

Fig. 6 is a fragmentary, vertical sectional view taken along the line 6—6 of Fig. 5, looking in the direction of the arrows;

Fig. 7 is an end view of the accessible end of the inner container and its contents as seen from the right end in Fig. 2;

Fig. 8 is a fragmentary, vertical sectional view taken along the line 8—8 of Fig. 7, looking in the direction of the arrows;

In the following detailed description of the invention reference will be made primarily to the packaging of saltine crackers, but it should be understood that the principles of the invention may also be utilized in the packaging of other types of crackers such as Graham crackers which also are best when consumed in fresh, crisp condition.

Figure 9:
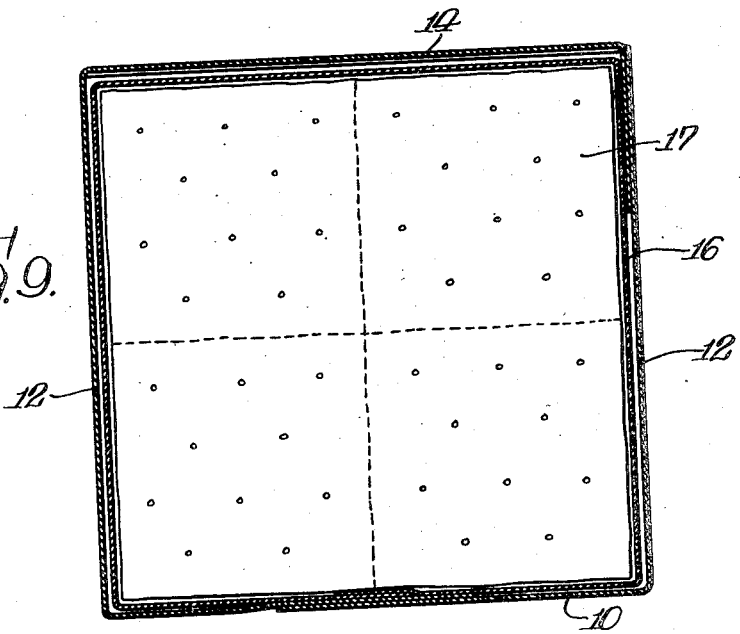
Fig. 9 is a transverse cross-sectional view of the entire box and contents as seen in Fig. 1 but with the cover of the outer box in closed position.

Referring now to Figs. 1 to 9, inclusive, the novel packaged product of my invention comprises an outer hexahedral box-like container 11, preferably of light weight cardboard, having a bottom wall 10, elongated side walls 12, end walls 13, and a cover 14. Disposed within the box 11 in relatively snug-fitting relationship therewith is an elongated, flexible, moisture-resistant, preformed bag or inner container 16. It is preferred that the bag 16 be formed from a moderately heavy grade of transparent moisture-proof cellulosic material, such as cellophane, although various other types of moisture-resistant paper may also be used. A predetermined quantity of relatively thin, flat, rectangular crackers 17 are disposed transversely within the bag in stacked face-to-face alignment therein, the bag 16 having a uniform rectangular cross-sectional shape conforming closely to the rectangular shape of the crackers 17 whereby the elongated sides of the bag are disposed in close proximity to the peripheral edges of the crackers 17 (Fig. 9).

One end 18 of the bag 16 is permanently closed so as to be substantially airtight, the material comprising this end of the bag being folded over and secured together by conventional heat-sealing or adhesive means in the region indicated at 19 in Figs. 5 and 6. The opposite end 21 of the bag 16 (Fig. 2) is open and unsealed but is pleated and folded over in the manner indicated in Figs. 2, 7, and 8 to provide a foldable and reusable closure for the bag.

It will be seen that in order to have sufficient material at the open end 21 of the bag 16 to permit closure by folding, the bag 16 must be only partially filled with crackers 17 thereby leaving a substantial free space or unfilled portion adjacent the open end of the bag. The bag 16, thus, is considerably longer than the quantity of crackers contained therein. In the embodiment of the invention illustrated in the drawings, the saltine crackers 17 are substantially square in shape as is also the cross-sectional shape of the bag 16 (Fig. 9) and comprise four cracker squares each. In this instance, it is desirable that the unfilled or free portion of the bag 16 be equal in length to at least the width of the crackers 17 or the cross-sectional width of the bag. Thus, as seen particularly in Figs. 2 and 8, the unfilled portion of the bag adjacent the open end 21 thereof may be pleated inwardly and folded over in one direction to provide a flat and neat appearing closure for the open end of the bag 16 which, although not hermetically sealed, does provide a substantially air-tight seal which prevents the circulation of moisture-containing atmospheric air and the penetration of the same into the crackers 17.

When the bag 16 is filled with crackers 17 and the open end 21 thereof is folded over in closed position, as in Fig. 2, the entire bag and contents fit snugly in the box 11 (Fig. 1) and it will be seen that the folded open end of the bag 16 is in abutting relation with an end wall 13 of the box 11 so as to retain the open end of the bag in folded condition. When the lid 14 is raised to the open position shown in Fig. 1, the bag is still in closed condition and access to its contents may not be had through the exposed wall thereof. The bag is still sealed and this feature permits a grocer to display the contents of the bag with the box cover open without spoilage of the contents. When it is desired to remove crackers from the package, a housewife may insert her hand between the open folded end of the bag and the box wall 13 and then lift that one end in the bag 16 and its contents from the box 11 so as to tilt the bag without complete removal although complete removal is perfectly satisfactory if desired. After the open end of the bag 16 has been made accessible by such tilting or removal, it may be unfolded, and crackers may be removed manually therefrom as shown in Fig. 3. It is to be understood that although the side walls of the bag conform closely to the peripheral edges of the stacked crackers, there is still sufficient space therebetween to permit the consumer's fingers to be inserted between the bag and the top edges of the crackers and permit their removal. When the bag is opened by unfolding the long end, it will be seen that the bag opening is reduced substantially to the size of the cracker and that when the first cracker or crackers in the stack are removed, the tendency is for air to be forced out of the bag ahead of the crackers, thus tending to prevent the ingress of moisture-laden air into the bag.

After the desired quantity of crackers has been removed the unsealed open end of the bag 16 may be immediately folded or rolled over in a plurality of overlapping folds, as shown at 22 in Fig. 4, to reclose the bag and protect the remaining crackers from atmospheric moisture and then the bag 16 may be restored to position within the box 11 with the folded end abutting the end wall 13. If maximum protection is desired in especially humid weather, the folded portion 22 of the bag 16 may be fastened with ordinary paper clips, or the bag may be integrally formed with bendable side clips such as are used on paper coffee bags, although ordinarily the moisture-resistant material of which the bag 16 is formed, such as cellophane, will be heavy enough to retain its folded and creased condition. By means of the moisture-resistant bag 16 and its foldable closure, I have found that the crackers will remain crisp and fresh down to the very last cracker and over extended periods of time, thereby avoiding all wastage and spoilage.

It will be seen that in the completely packaged article (Fig. 1), access to the crackers may be had only by first opening the cover 14 of the box 11, then lifting out at least the folded end of the bag 16, and unfolding the latter to remove the crackers. In the saltine cracker packages heretofore manufactured, the opening of the cover of the outer box and the parting of the loose wax paper lining immediately exposes all of the crackers from end to end in the box to the effects of atmospheric moisture. Since the crackers in such known packages are stacked on their side edges and because of their normal irregularity of surface, air spaces of considerable size exist between the respective crackers through which moisture-laden air may pass as air circulation is set up over and throughout the entire body of crackers. However, by my packaging technique employing a restricted end-opening, elongated, preformed bag for the crackers, with the crackers stacked in alignment with the air channels therebetween substantially closed by the relatively close fitting bag, the crackers are protected from the moisture-laden air even during the short period of time the bag is open to permit cracker removal. Furthermore, when the crackers are being removed for consumption, the air which tends to move into the bag as it is opened tends to be expelled out of the bag ahead of the crackers, and on account of the relatively close fit and close conformity of the side walls of the bag 16 to the peripheral edges of the crackers 17, the opportunity for circulation of moisture-laden outside air is greatly minimized. Furthermore, since humid or moisture-containing air has a lower density than dry air, it will not tend to drop down within the restricted bag opening and hence the crackers within the bag 16 between the permanently sealed end 18 thereof and the top cracker will not ordinarily be penetrated by outside air during opening of the bag, such inner crackers being almost completely enclosed.

Another feature of my invention, particularly important from a sales point of view, is the fact that the transparent inner bag 16 affords an attractive method of displaying a sample package of crackers in the grocery store by opening the cover 14 in the manner shown in Fig. 1 since there are no fold or sealing lines on the exposed surface thereof. Other advantages from the sales point of view are found in the fact that the elongated exposed sides of the bag 16 may be printed with appropriate directions and advertisements, and after the crackers have been consumed, the bag 16 may also be used by the housewife as a crisper bag for a variety of household purposes.

Although certain types of food products have been packaged heretofore in elongated preformed cellophane bags, the individual articles have not been loaded into the bags in stacked or carefully aligned condition. On the contrary, haphazard dumping or random loading techniques have been employed. However, it will be evident that thin, crisp, and fragile crackers of the saltine type or of the crisp Graham cracker type cannot be loaded by such dumping methods because of the danger of breakage in transit and the large amount of waste space that would result in the loaded package so as to permit air circulation therewithin. Accordingly, an important feature of my invention is the loading or packaging method whereby the crackers may be enclosed in a preformed moisture-proof bag having a reusable closure and at the same time are disposed in the bag in accurately aligned, stacked condition with the walls of the bag conforming closely to the bulk shape of the aligned crackers for the purposes hereinabove set forth.

Figure 10:
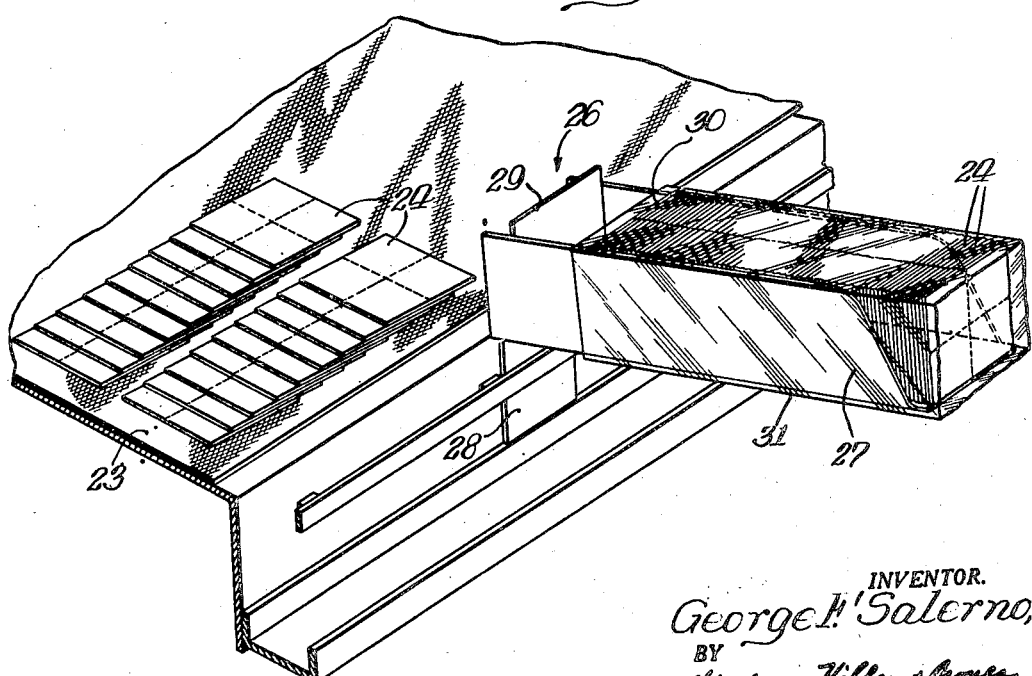
Fig. 10 is a perspective view of a loading device showing the method of filling the inner container with crackers in aligned condition.

Referring now to Fig. 10, the preferred method of assembling and loading the packaged product of my invention is therein illustrated. A moving belt conveyor 23 transports the crackers disposed thereon in overlapping rows 24 to a loading point or station at which there is located a loading device indicated generally at 26 which device is more fully described and claimed in a copending application, Ser. No. 22,188, filed April 20, 1948, in which I am named as a joint inventor. This loading device comprises an elongated inclined chute or loading receptacle 27 having a flat bottom, upstanding sides, and an open end portion. The loading device 26 is adjustably mounted adjacent the belt conveyor 23 by means of a bracket 28. An operator manually may transfer a predetermined quantity of crackers from the belt conveyor 23 in stacked face-to-face alignment into the receptacle 27. The rear end of the stack of crackers abuts a spacer-ejector member 29 which is slidable relative to the receptacle 27 and has a cracker engaging front plate 30 for ejecting the contents of the receptacle into the bag. The open end of a bag 31, of the type hereinbefore described, is slipped telescopically over the open end of the loaded receptacle 27 to a portion of its extent, as seen in Fig. 10, and the operator then moves the ejector member 29 outwardly away from the conveyor to force the crackers down into the bottom of the bag and to cause the filled bag to slip from the loading device. The packaging operation may then be completed merely by folding over the open end of the bag 31 in the manner shown in Fig. 2 and inserting the loaded bag into the box-like outer container without the necessity of any heat sealing operation. By elimination of the objectionable heat seal which would result in the destruction of the overlapping closure under ordinary usage and consumer habits, the closure end of the bag remains intact and the unused crackers are protected from exposure to air.

Although the invention has been illustrated and described in connection with one particular embodiment as depicted in the drawings and in connection with the packaging of saltine crackers, it will be understood that various modifications and equivalents may be resorted to without departing from the scope of the invention as defined in the appended claims.

I claim:

1. A packaged food product comprising an elongated, flexible, moisture-resistant bag permanently sealed at one end and unsealed but folded over at its opposite end to protect the contents of the bag from atmospheric moisture, a quantity of crackers disposed in stacked alignment in said bag, and an outer container for said bag adapted to receive the latter with a closed end wall of said container abutting the folded end of said bag for retaining the same in folded condition.

2. A packaged food product comprising a semirigid container having four side walls and a pair of end walls and one of said walls comprising a cover, a flexible, moisture-resistant bag adapted to fit closely within the container and being permanently sealed at one end thereof and having its opposite end unsealed and folded over, said opposite end when in open position being of greater length than the contents thereof and said opposite end when in folded condition being closely adjacent one of the walls of said container, and a quantity of crackers disposed in stacked alignment in said bag.

3. A packaged food product comprising an elongated semi-rigid container having four elongated side walls and a pair of end walls and one of said elongated side walls comprising a cover for the container, an elongated, flexible, moisture-resistant bag adapted to fit closely within said container and being permanently sealed at one end thereof and having its opposite end unsealed and folded over, and a quantity of crackers disposed in stacked alignment in said bag with the side walls of the bag in close conformity to the peripheral edges of the stacked crackers, said folded end of said bag abutting one of said end walls of said container whereby access to said crackers can be had only by opening said cover on said container, removing the folded end of said bag from the container, and unfolding the folded end.

4. A packaged food product comprising an elongated semi-rigid container having side walls and end walls and one of said walls comprising a cover, an elongated flexible, moisture-resistant bag adapted to fit within the container and being permanently sealed at one end thereof and having its opposite end unsealed and folded over, and a quantity of crackers disposed in stacked alignment in the bag, the planes of the respective crackers being disposed substantially at right angles to the length of said bag and parallel to the plane of the opening at the unsealed end of the bag, the side walls of the bag being in close conformity to the peripheral edges of the stacked crackers but permitting insertion of a finger therebetween to permit cracker removal, and said folded end of the bag when in open position being of greater length than the contents thereof and when in folded condition being closely adjacent one of said container walls.

GEORGE F. SALERNO.

REFERENCES CITED

The following references are of record in the file of this patent:

UNITED STATES PATENTS

| Number | Name | Date |
| --- | --- | --- |
| 1,431,712 | Weinstein | Oct. 10, 1922 |
| 1,917,571 | Becker | July 11, 1933 |
| 2,141,725 | Rosefield | Dec. 27, 1938 |
| 2,406,660 | Brady | Aug. 27, 1946 |
| 2,424,553 | Conti | July 29, 1947 |